United States Patent
Kawamura

[11] 4,277,128
[45] Jul. 7, 1981

[54] ANAMORPHIC Fθ LENS SYSTEM

[75] Inventor: Atsushi Kawamura, Yokosuka, Japan

[73] Assignee: Ricoh Company, Ltd., Japan

[21] Appl. No.: 20,711

[22] Filed: Mar. 15, 1979

[30] Foreign Application Priority Data

Mar. 23, 1978 [JP] Japan ......................... 33917

[51] Int. Cl.³ ......................... G02B 13/08; G02B 27/17
[52] U.S. Cl. ...................................... 350/6.8; 350/420
[58] Field of Search ............................................. 350/6.8

[56] References Cited

U.S. PATENT DOCUMENTS

| 3,946,150 | 3/1976 | Grafton | 350/6.8 X |
| 3,973,833 | 8/1976 | Lawson | 350/6.8 X |
| 4,121,883 | 10/1978 | Goshima et al. | 350/6.8 |
| 4,123,135 | 10/1978 | Rabedeau | 350/6.8 |

Primary Examiner—John K. Corbin
Assistant Examiner—Scott J. Sugarman
Attorney, Agent, or Firm—McGlew and Tuttle

[57] ABSTRACT

An anamorphic fθ lens system, with respect to a sweeping surface, has a pupil position positioned to coincide with a reflective surface of a rotating polyhedric mirror. Parallel incident light at an angle θ with respect to an optical axis is converges on a scanning surface at a position separated from the optical axis by a distance proportional to θ. In the divergent direction of the reflected light from the reflection surface, there is a conjugate relationship between the reflection surface and the scanning surface, where the reflection surface is an object surface, and the scanning surface is an image surface.

7 Claims, 9 Drawing Figures

DISTORTION (H = tanθ)

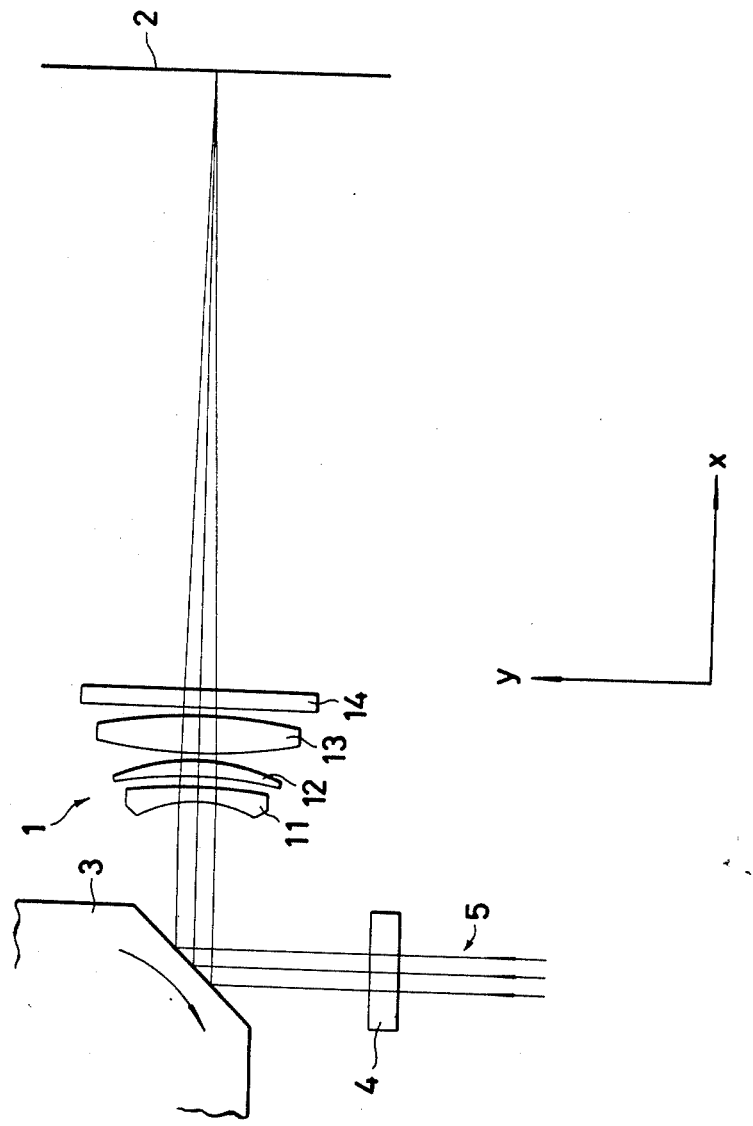

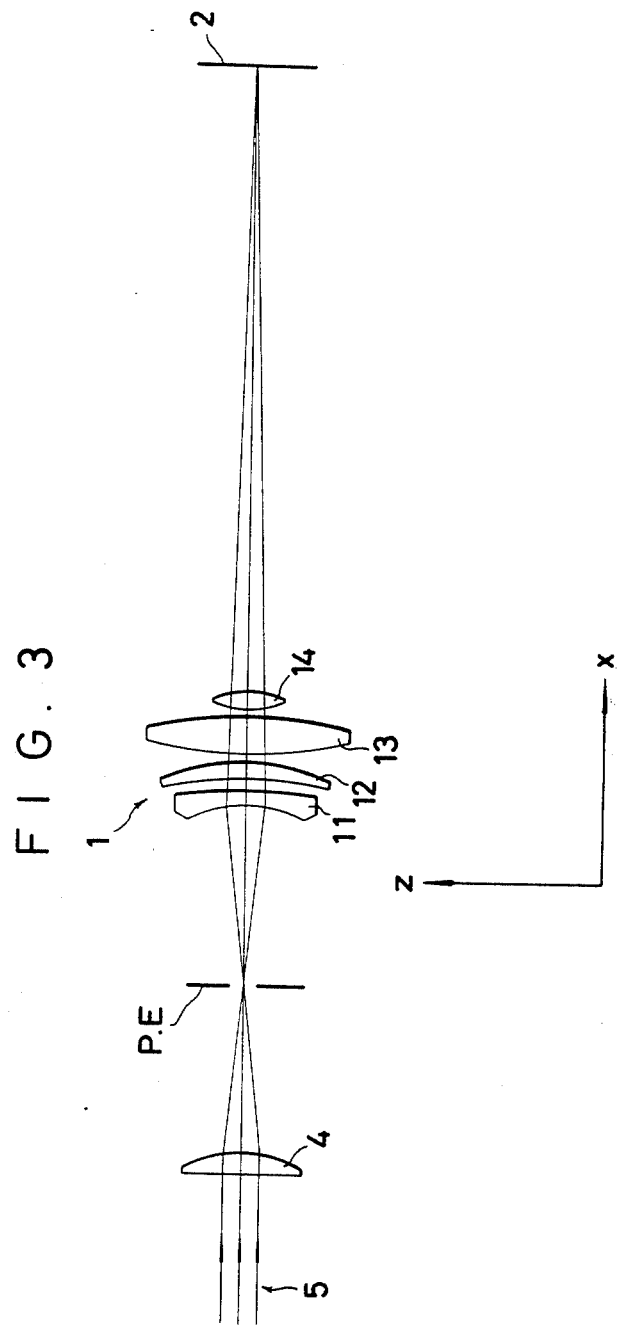

DISTORTION (H=f·θ)      ASTIGMATISM      SPHERICAL ABERRATION

SPHERICAL ABERRATION

ANAMORPHIC Fθ LENS SYSTEM

BACKGROUND OF THE INVENTION

The present invention relates to an anamorphic fθ lens system.

Recently, an optical scanning system capable of performing line scanning by deflecting periodically a luminous flux has been employed as a facsimile reception and recording apparatus in which the flux, which travels in a predetermined direction is deflected, in one direction within a predetermined plane by a rotating polyhedric mirror. The luminous flux is caused to converge on a scanning plane by a convergent lens system.

The fθ lens system is employed as a convergent lens system in such an optical lens system and serves not only to converge the deflected luminous flux on a scanning surface, but also to move in uniform motion the converged portion of the luminous flux which is deflected at an equal angular velocity. The parallel pencil of rays incident upon the fθ lens system with an angle θ with respect to the optical axis of the fθ lens system, passing through the pupil thereof, is converged upon a point on the scanning surface. The point is separated from the optical axis by a distance proportional to fθ, where f is the focal distance of the fθ lens system. Therefore, in the case where the angle θ of the incidence of the pencil of rays on the fθ lens system, with respect to the optical axis, is changed at a uniform variation ratio, the spot of the convergent pencil of rays is moved in uniform motion on the scanning surface.

The rotating polyhedric mirror is a regular polygonal pillar or a regular polygonal cylinder whose peripheral surfaces constitute mirrors, and which is rotated about the axis of symmetry of the mirror. A luminous flux incident on the rotating polyhedric mirror from one direction is reflected by one mirror of the rotating polyhedric mirror, and the reflected luminous flux sweeps a predetermined plane as the rotating polyhedric mirror is rotated, and each time the mirror surface for reflecting the luminous flux is changed over during the rotation of the rotating polyhedric mirror, the above-mentioned sweeping is repeated. Of the mirror surfaces of the rotating polyhedric mirror, the mirror which is in a position where the luminous flux enters and which serves to reflect the luminous flux is referred to as a reflecting surface, and a plane which is swept by the reflected luminous flux is referred to as a scanned surface.

When the above-mentioned rotating polyhedric mirror is used, conventionally, there occur the following problems: The angle of each mirror surface of the rotating polyhedric mirror with respect to a rotating axis of the rotating polyhedric mirror differs slightly by a production error, so that the swept surface varies slightly each time the reflecting surface is changed over during the rotation of the rotating polyhedric mirror. In accordance with the variation of the swept surface, the position of the scanning line is slightly changed on the scanning surface and consequently, irregularity of the pitch of the line scanning occurs.

The irregularity of the pitch can be reduced so that the irregularity does not become a substantial problem by sufficiently increasing the production accuracy of the rotating polyhedric mirror. In that case, however, the production cost of the rotating polyhedric mirror becomes quite high.

Alternatively, a method of reducing optically the above-mentioned irregularity of the pitch is known as is disclosed in the Japanese laid-open patent application No. Sho-48-49315, in which a cylindrical lens is disposed in the optical path of a luminous flux and on the side of a light source in view of a rotating polyhedric mirror, and a cylindrical lens or a toroidal lens is disposed on the scanned side. The toroidal lens here means an arc-shaped cylindrical lens.

However, in the case where the irregularity of the pitch is reduced by this method, an experiment shows that the convergency of the convergent pencil of rays is significantly lowered near the starting portion and the end portion of the line scanning when the cylindrical lens is disposed on the above-mentioned scanned side, so that the spot of the convergent pencil of rays becomes blurred. Furthermore, in the case where the toroidal lens is employed, the production cost of the toroidal lens is so high that the cost of the optical scanning apparatus becomes high.

SUMMARY OF THE INVENTION

It is therefore an object of the present invention to provide an anamorphic fθ lens system capable of avoiding the disadvantages of the conventional optical scanning system. According to the present invention, in an anamorphic fθ lens system, a pupil position is positioned with respect to a sweeping surface to coincide with a reflection surface of a rotating polyhedric mirror, and parallel incident light, at an angle θ with respect to an optical axis, is caused to converge on a scanning surface at a position spaced from the optical axis by a distance porportional to θ. In the divergent direction of the reflected light from the reflection surface, there is a conjugate relationship between the reflection surface and the scanning surface, such that the reflection surface is an object surface, and the scanning surface is an image surface.

BRIEF DESCRIPTION OF THE DRAWINGS

For a better understanding of the invention as well as the objects and other features thereof, reference will be had to the following description which is to be read in conjunction with the drawings therein:

FIG. 2 and FIG. 3 are optical diagrams for explaining an optical scanning system in which the anamorphic fθ lens system according to the present invention is employed;

DETAILED DESCRIPTION OF THE PREFERRED EMBODIMENTS

An anamorphic fθ lens system according to the present invention has particular optical characteristics in the two directions normal to the optical axis thereof, respectively. Hereafter, the direction parallel to the optical axis is referred to as direction X, and the above-mentioned two directions are referred to as direction y and direction z, respectively.

Figure 1:
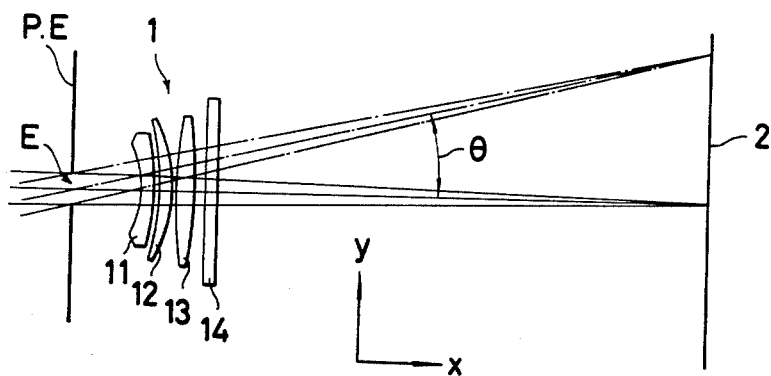
FIG. 1 shows schematically an embodiment of an anamorphic fθ lens system according to the present invention.

Referring to FIG. 1, there is shown an embodiment of an anamorphic fθ lens system according to the present invention. FIG. 1 shows a schematic sectional view of an anamorphic fθ lens system 1, in which the plane of the drawing contains the optical axis and is parallel to the direction y (and is therefore referred to as plane xy). Referring to FIG. 1, the optical characteristics of the anamorphic fθ lens system 1 in the direction y and the direction z will now be explained.

The fθ lens system 1 comprises a negative meniscus lens 11, a positive meniscus lens 12, a biconvex lens 13, and a cylindrical lens 14. The cylindrical lens 14 is disposed so that the non-curvature side thereof faces in the direction y.

The optical characteristics of the fθ lens system 1 in the direction y are as follows: With respect to the plane xy, a pupil E is placed on the left side. A parallel luminous flux which enters the fθ lens system 1, passing through the pupil E and travelling parallel to the plane xy, at an angle θ with respect to the optical axis of the fθ lens system, is converged on an image surface 2 at a position away from the optical axis by a distance porportional to fθ in the direction y, where f is the focal length of the fθ lens system 1 in the direction y. In other words, with respect to the direction y, the fθ lens system 1 has the same characteristics as those of the conventional fθ lens system.

The optical characteristics in the direction z are as follows: In the direction z, the fθ lens system relates the of combining a pupil surface P.E. and the image surface 2 in terms of image formation. In other words, in the direction z, the pupil surface P.E. and the image surface 2 are combined in a conjugate relationship such that the image surface 2 is an image surface conjugate with the pupil surface P.E. when the pupil surface P.E. is an object surface.

Aberration correction is performed with respect to an object at infinity in the direction y, and the fθ lens system is designed so that the image height H and the angle of incidence θ are related according to the equation of $H = k \cdot f\theta$, where k is constant. Furthermore, in the direction z, the fθ lens system is designed so that the spherical aberration becomes small when the pupil surface P.E. is an object surface and the image surface 2 is an image surface conjugate with the object surface.

FIGS. 2 and 3 show how the fθ lens system 1 is used in an optical scanning system. In FIGS. 2 and 3, reference numeral 3 represents a rotating polyhedric mirror and reference numeral 4 a cylindrical lens.

A parallel luminous flux 5 transmits through the cylindrical lens 4 and is converged in the direction z which is normal to FIG. 2, without its parallel characteristic being lost in the plane xy. In other words, the parallel luminous flux 5 becomes a convergent pencil of rays after it passes through the cylindrical lens 4.

The rotating polyhedric mirror 3 is disposed so that its reflecting surface is positioned near the converging position of the convergent pencil of rays that converge in one direction. In the present embodiment, the rotating polyhedric mirror 3 is shaped like a regular octagonal cylinder and the rotating axis is positioned parallel to the direction z, whereby the surface swept by the reflected luminous flux can be caused to coincide with the plane xy. Furthermore, by this arrangement, the pencil of rays convergent in one direction becomes a pencil of rays divergent in the direction z, after being reflected by the rotating polyhedric mirror 3, while maintaining the parallel characteristic within the swept surface, namely the plane xy. Here, the swept surface is an ideal swept surface without taking into consideration any variation thereof.

The fθ lens system 1 is disposed so that its pupil nearly coincides with the reflecting surface of the rotating polyhedric mirror 3. Therefore, with respect to the plane xy, the above-mentioned one direction divergent pencil of reflected rays converges on the image surface 2, after passing through the fθ lens system 1. As a matter of course, the converging position is away from the optical axis of the fθ lens system 1 by a distance proportional to the angle θ of incidence onto the fθ lens system 1, with respect to the plane xy.

In the direction z, since the fθ lens system 1 combines the pupil plane and the image plane in a conjugate relationship on the image surface 2, there is formed an image of the section of the luminous flux at the position of the pupil. Therefore, as mentioned previously, the reflecting surface of the rotating polyhedric mirror 3 concides with the position of the pupil, and the pencil of rays convergent in one direction is incident on the reflecting surface and is converged in the direction z on the reflecting surface. As a result, the reflected luminous flux is converged by the fθ lens system 1 in the direction z as shown in FIG. 3. FIG. 3 is a developed view of the fθ lens system in the direction of advancement of the luminous flux, in which the pupil plane P.E. indicates the position of the reflecting surface. Thus, the light reflected by the reflecting surface is converged on the image surface 2 in the direction z as well as in the direction y.

The scanning surface is set so as to coincide with the image surface 2. Therefore, when the rotating polyhedric mirror 3 is rotated in the direction of the arrow in FIG. 2, the line scanning is performed in uniform movement by the spot of the convergent pencil of reflected rays.

As mentioned previously, since the image of the convergent portion of the one direction convergent pencil of ray incident on the reflecting surface is formed on the image surface 2 in the direction z the converging point of the reflected luminous flux on the image surface 2 is not varied in the direction z, even if the surface scanned by the reflected luminous flux is slightly varied by a scattered parallelism of the mirror surfaces of the rotating polyhedric mirror 3 with respect to the axis z z. In this case, the variation of the converging point of the reflected luminous flux in the direction z is caused by the variation of the converging position of the one direction convergent pencil of rays incident on the reflection surface in the direction z, which is caused by the above-mentioned scattering of the parallelism. However, the variation of the configuration of the converging position of the pencil of rays convergent in one direction and the reflection surface is so small that the variation of the converging position in the direction z is extremely small. Accordingly, the variation of the converging point on the image surface 2 is extremely small. Thus, by use of the fθ lens system 1 in the above-mentioned manner, the irregularity of the pitch of the line scanning in the optical scanning can be significantly reduced.

In the method of the previously mentioned Japanese laid-open patent application No. Sho-48-49315, a high accuracy is required in forming the cylindrical lens or the toroidal lens disposed between the rotating polyhedric mirror and the fθ lens system, and of the fθ lens system. However, there is not such a problem in the anamorphic fθ lens system according to the present invention, and what is necessary is to perform accurate adjustment of the position of the fθ lens system with respect to the reflection surface and the scanning surface of the rotating polyhedric mirror. Furthermore, the production cost of the anamorphic fθ lens system according to the present invention is lower and the size is smaller than the anamorphic lens.

The fθ lens system 1 is constructed as follows:

| | | | |
|---|---|---|---|
| (I) | Negative Meniscus Lens 11 | | |
| | Curvature radius of the lens surface on the object side | | −18mm |
| | Curvature radius of the lens surface on the image side | | −160mm |
| | Refraction surface distance | | 2.1mm |
| | Refractive index | | 1.592 |
| (II) | Positive Meniscus Lens 12 | | |
| | Curvature radius of the lens surface on the object side | | −61mm |
| | Curvature radius of the lens surface on the image side | | −24mm |
| | Refraction surface distance | | 3.3mm |
| | Refractive index | | 1.605 |
| (III) | Biconvex Lens 13 | | |
| | Curvature radius of the lens surface on the object side | | 330mm |
| | Curvature radius of the lens surface on the image side | | −43mm |
| | Refraction surface distance | | 3.0mm |
| | Refractive index | | 1.618 |

The above-mentioned three lenses are rotationally symmetrical with respect to the optical axis.

| | | | | |
|---|---|---|---|---|
| (IV) | Cylindrical Lens 14 | | | |
| | Curvature radius of the lens surface on the object side | Direction y | ∞ | |
| | | Direction z | 44mm | |
| | Curvature radius of the lens surface on the image side | Direction y | ∞ | |
| | | Direction z | −18mm | |
| | Refraction surface distance | 1.9mm | | |
| | Refractive index | 1.515 | | |
| (V) | Refraction surface distance between the negative meniscus lens 11 and the positive meniscus lens 12: 1.9mm | | | |
| (VI) | Refraction surface distance between the positive meniscus lens 12 and the biconvex lens 13: 0.4mm | | | |
| (VII) | Refraction surface distance between the biconvex lens 13 and the cylindrical lens 14: 0.7mm | | | |
| (VIII) | Distance between the pupil and the lens surface of the negative meniscus lens 11 on the object side: | Direction y | −11.1mm | |
| | | Direction z | 0.0mm | |
| (IX) | Distance between the object and the lens surface of the negative meniscus lens 11 on the object side: | Direction y | ∞ | |
| | | Direction z | −11.1mm | |

The thus-constructed anamorphic fθ lens system has a focal length of 100 mm in the direction y and a focal length of 17.7 mm in the direction z.

Referring to FIG. 4 through FIG. 9, there are shown the aberration diagrams of the fθ lens system.

FIGS. 4 to 7 relate to the aberration diagrams on the image surface in the direction y.

Figure 4:
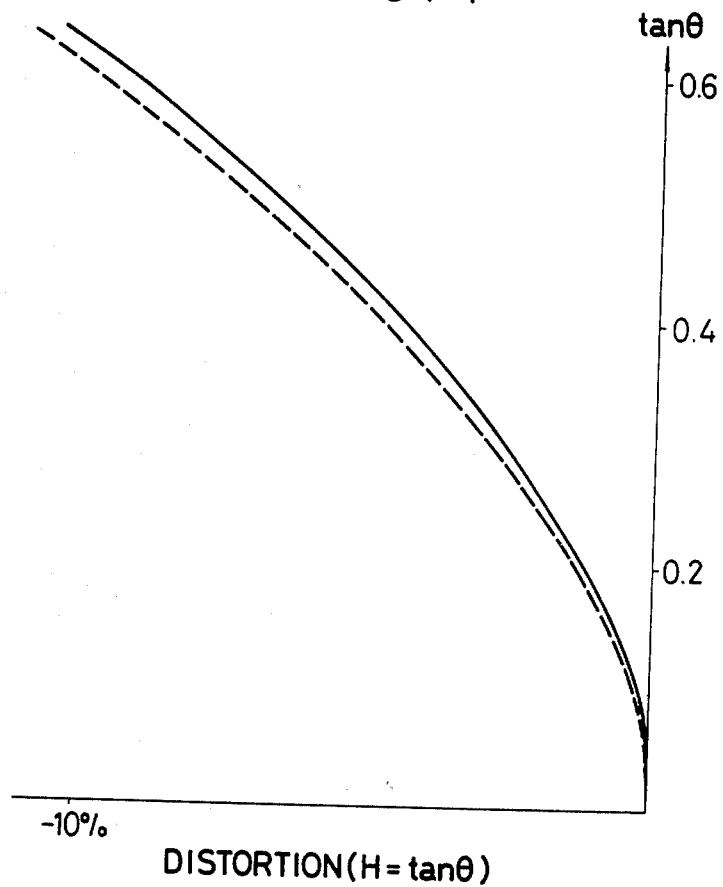
FIGS. 4 through 8 show the various types of aberrations of the anamorphic fθ lens system according to the present invention.

FIG. 4 shows distortion when the image height H=f·tan θ. In FIG. 4, the dash lines indicate an ideal distortion.

Figure 5:
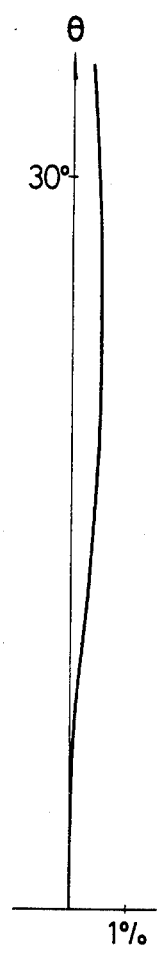

FIG. 5 shows distortion when the image height H=f·θ.

Figure 6:
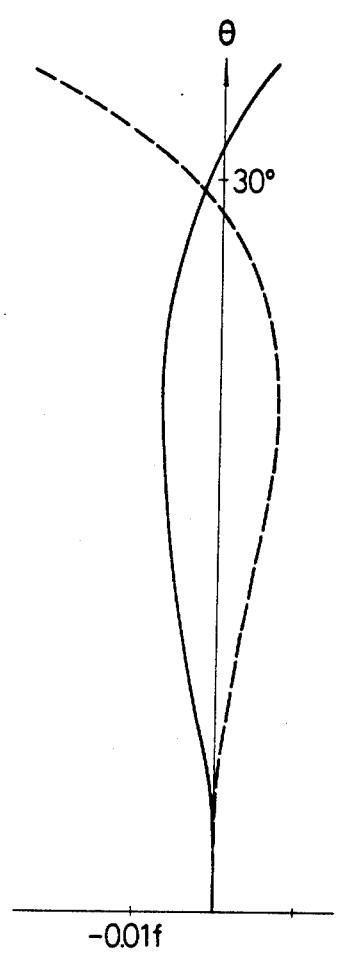

FIG. 6 shows the astigmatism. In FIG. 6, the solid line indicates the astigmatism in the sagittal direction, and the dash lines indicate the astigmatism on the meridional image surface.

Figure 7:
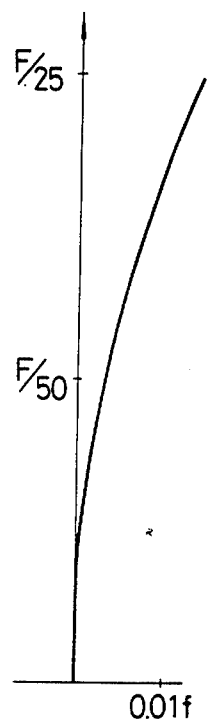
Figure 8:
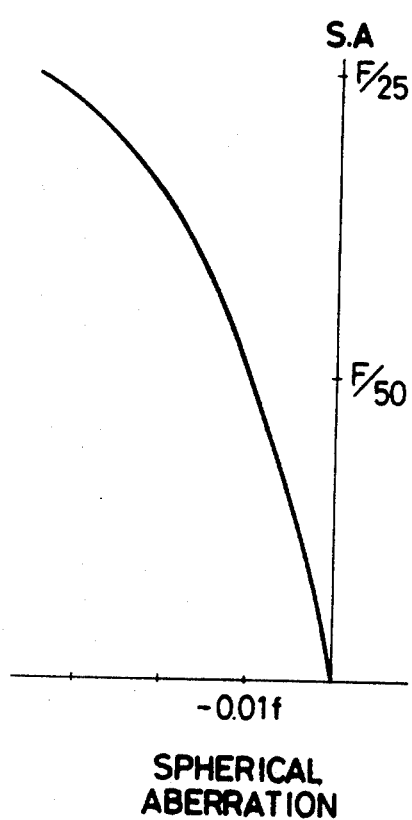

FIGS. 7 and 8 show the spherical aberration. As can be seen from these aberration diagrams, this embodiment of the fθ lens system has the features of the anamorphic fθ lens system. In practice, when the optical scanning was performed in the method as shown in FIGS. 2 and 3 by use of this fθ lens system, the optical scanning without any irregularity of the pitch was performed in the shape of a proper scanning spot.

The fθ lens system 1 is one embodiment of an fθ lens system according to the present invention. It is possible to construct the fθ lens system according to the present invention in some other different construction.

Figure 9:
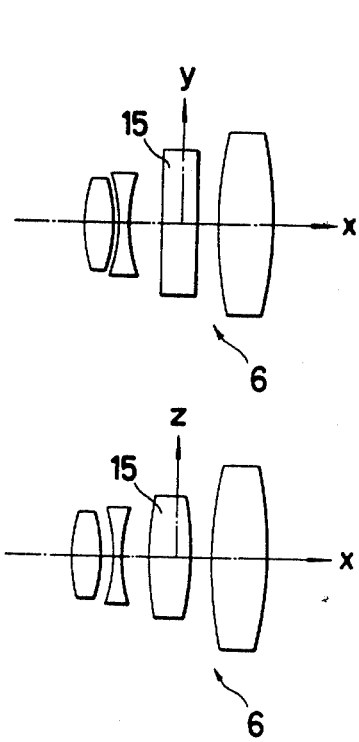
FIG. 9 shows schematically another embodiment an anamorphic fθ lens system according to the present invention.

For instance, as shown in FIG. 9, an anamorphic fθ lens 6 can be constructed by inserting a cylindrical lens 16 in a comparatively long second air gap portion of a triplet type fθ lens. Furthermore, instead of the cylindrical lenses 14 and 15, a lens whose curvature radius is different in the direction y and in the directions z can be employed.

In the case where the anamorphic fθ lens system according to the present invention is employed, the spot shape of a convergent pencil of rays on the scanning surface can be changed by changing the combination of the focal length of the cylindrical lens 4 and that of the cylindrical lens 14, and the spot diameter can be changed by defocussing of the fθ lens system.

What is claimed is:

1. An optical scanning system comprising:
a scanning surface; cylindrical lens means; and optical means establishing an optical axis that passes through said cylindrical lens means and intercepts said scanning surface, said optical means comprising an anarmorphic fθ lens system spaced on said optical axis between said cylindrical lens means and said scanning surface, and rotatable polyhedric means on said optical axis between said cylindrical lens means and said anarmorphic fθ lens system and comprising a plurality of light-diverting surfaces equally angularly displaced from each other to form a closed polyhedron symmetrical about an axis of rotation and located so that said optical axis intercepts each of said light-diverting surfaces in turn at an interception location as said polyhedric means rotates on its axis of rotation, whereby the portion of said optical axis, between said interception location and through and beyond said cylindrical lens remains substantially stationary and the portion of said optical axis between said interception location and said scanning surface sweeps along a line on said scanning surface as a function of the instantaneous angular position of said rotatable polyhedric means, the focusing power of said cylindrical lens means, and the location thereof relative to said interception location being such that a beam of light rays centered on said optical axis and parallel to each other on the side of said cylindrical lens means facing away from said polyhedric means are substantially at a line focus at said interception location, and the focusing power of said anamorphic fθ lens system and location thereof relative to said scanning surface and to said cylindrical means is such that said beam which is substantially at a line focus at said interception location is substantially at a point focus at said scanning surface;

said anamorphic fθ lens system comprising, starting from a side thereof facing said polyhedric means, a negative meniscus lens, a positive meniscus lens spaced from said negative meniscus lens, a biconvex lens spaced from said positive meniscus lens, and a cylindrical lens spaced from said biconvex lens.

2. The optical scanning system of claim 1 in which said light-diverting surfaces are parallel to said axis of rotation.

3. The optical scanning system of claim 1 in which said optical axis sweeps said line on said scanning surface in a plane parallel to the plane in which said line focus lies and perpendicular to said axis of rotation.

4. The optical scanning system of claim 1 in which said light-diverting surfaces are planar mirrors.

5. The optical scanning system of claim 4 in which there is a conjugate relationship between said interception location and said scanning surface, said interception location being in an object surface and said scanning surface being an image surface, with respect to said object surface.

6. An optical scanning system according to claim 1, wherein said negative meniscus lens has a curvature radius on an object side thereof of −18, a curvature radius on an image side thereof of −160, a refraction surface distance of 2.1 and a refractive index of 1.952; said positive meniscus lens has a curvature radius on an object side thereof of −61, a curvature radius on an image side thereof of −24, a refractive surface distance of 3.3 and a refractive index of 1.605; said biconvex lens has a curvature radius on an object side thereof of 330, a curvature radius on an image side thereof of −43, a refractive distance of 3.0 and a refractive index of 1.618; said cylindrical lens having a curvature radius on an object side thereof of 44, a curvature radius on an image side thereof of −18, a refractive surface distance of 1.9, and a refractive index of 1.515; the refraction surface distance between said negative meniscus lens and said positive meniscus lens being 1.9; the refraction surface distance between said positive meniscus lens being 1.9; the refraction surface distance between said positive meniscus lens and said biconvex lens being 0.4; the refraction surface distance between said biconvex lens and said cylindrical lens being 0.7.

7. An optical scanning system according to claim 6, including means defining a pupil between said polyhedric means and said anamorphic fθ lens system, the distance between said pupil and said negative meniscus lens on an object side thereof being −11.1, the distance between an object and the negative meniscus lens on an object side thereof being −11.1.

* * * * *